Patented Aug. 16, 1949

2,479,409

UNITED STATES PATENT OFFICE 2,479,409

COATING COMPOSITIONS AND ARTICLES COATED THEREWITH

Milton J. Roedel, Wilmington, Del., assignor to E. I. du Pont de Nemours & Company, Wilmington, Del., a corporation of Delaware No Drawing. Application October 6, 1943, Serial No. 505,238

8 Claims. (Cl. 220—64)

This invention relates to an improved coating composition for metallic surfaces and more particularly to coatings comprising copolymers of vinyl chloride with an alpha,beta-butenedioic ester for metal food containers.

Polymeric materials have been used for the coating of metals, including the interior surfaces of metal food containers. For many purposes these coatings are satisfactory, particularly on dipped tin plate which in itself offers considerable protection. However, for use over black plate or even over thin electrolytic tin plate, it has been difficult to obtain satisfactory coatings. This is particularly true for coatings for metal to be used for canning of acidic foodstuffs, meats, fish, etc. In view of the current shortages of tin and the consequent increased use of black plate, there is accordingly an urgent need for a superior coating material for use for canning of foodstuffs. Certain phenolic resins, as well as certain chlorine containing polymeric materials have found wide use as protective coatings. However, coatings based on such polymeric materials as polyvinyl chloride, vinyl chloride-vinyl acetate copolymer, chlorinated rubber, rubber hydrochloride, etc., have not been found satisfactory for use over black plate, tin plate, or bonderized plate for wet pack foodstuff containers since they are too water-sensitive and undergo pronounced blushing during the food processing operation.

The requirements are very stringent for protective coatings for metallic surfaces for wet pack containers; the coating must possess excellent adhesion after the container contents are processed at elevated temperatures, e. g., 2 hours at 121° C. in the presence of water and foodstuff; the coating must be impermeable since the metallic materials used react readily with water and acid foodstuffs and stain readily with sulfur-containing protein foodstuffs; the coating must be scratch-resistant in order to withstand the hard usage it receives before and during the can fabrication steps; and the coating must be flexible enough to withstand can-forming operations. Other properties which are desirable include resistance to essential oils, odorlessness, tastelessness, and a pleasing appearance.

This invention has as an object the production of new and improved coated metal articles. A further object is the manufacture of improved coated metal food containers. A still further object is the production of wet pack food containers having an interior protective coating which has high scratch resistance, high adhesion, high impermeability, and which is highly resistant to water and steam even when the steam is under pressure and which do not blush or assume an unattractive appearance. Other objects will appear hereinafter.

The above objects are accomplished by the production of a composition comprising a solution of the copolymerization product of vinyl chloride with 3 to 20%, based on the weight of the two copolymer ingredients, of an alpha,beta-butenedioic ester and to which solution is added a minor proportion of a heat-hardening phenol-formaldehyde resin, and by applying this composition to a metallic surface followed by baking with elimination of the solvent.

The above mentioned copolymers of vinyl chloride and an alpha,beta-butenedioic ester are obtained by known procedures through the polymerization with heat and pressure of vinyl chloride monomer and an alpha,beta-butenedioic ester monomer in the presence of water and a peroxygen catalyst. Suitably, 90% to 97% of the above defined copolymer with from 3% to 10% of a heat-hardening phenol-formaldehyde resin of the group consisting of alkyl substituted and polynuclear phenol-formaldehyde resins is employed. Suitable solvents for these compositions are aliphatic or cycloaliphatic ketones or such materials as will dissolve the copolymer composition and can be evaporated from the coated metal surface. These solutions are then applied to a metal surface in quantities sufficient to give after baking at 100°–200° C. for 10–30 minutes a coating having a film thickness preferably in the range of 0.1 to 0.4 mil. These coatings are highly inert and due to their outstanding flexibility, the polymer coated metal is not only capable of withstanding the can forming operations of crimping and bending but can even withstand the deep die-drawing operation required in the manufacture of seamless containers; e. g., sardine cans. They are outstandingly superior to other vinyl chloride polymers heretofore prepared.

The invention is further illustrated but not limited by the following examples in which the parts are by weight.

Example I

A copolymer having a viscosity of 1.0 poise as measured on a 10% solution in cyclohexanone at 25° C. is prepared by the copolymerization of 95 parts of vinyl chloride with 5 parts of dimethyl fumarate. A solution which consists of 135 parts of this copolymer, 15 parts of diphenylolpropane-formaldehyde resin, 425 parts of methyl isobutyl ketone, 340 parts of cyclohexanone, and 85 parts of xylene is then prepared. The diphenylolpropane-formaldehyde resin is suitably dissolved in some of the methyl isobutyl ketone before addition to the solution. The above solution of the copolymer, resin and solvents has a Gardner-Holdt viscosity of E.

The above resin solution is applied by roller-coating onto a cleaned sheet of black plate, at a coating weight of between 2.5 and 5 mg. per sq. in. After baking at approximately 200° C. for about 10 minutes there is produced a coating on the metal which is transparent, substantially colorless, tenaciously adherent, very scratch-resistant, and extremely flexible as judged by the fact that the coating exhibits no film failure when a seamless sardine can body is formed from the coated sheet by a deep die-drawing operation. Furthermore, when sardines or other sea foods or meats are processed in this container the coating does not appreciably blush nor does the metal become stained by the sulfur-containing foodstuff due to the coating's excellent impermeability characteristics. The coating also protects the black plate from corrosive influences over a long period of time and does not impart an odor or a taste to the contents.

Example II

A copolymer prepared by the polymerization of 80 parts of vinyl chloride and 20 parts of dimethyl maleate and which copolymer had a viscosity as measured on a 10% solution in cyclohexanone at 25° C. of 0.5 poise, is used to give a solution for employment in the preparation of coatings. This solution is prepared from 190 parts of the above copolymer, 10 parts of "Durez 175" resin (a commercially available heat-hardening phenol-aldehyde resin), 400 parts of methyl isobutyl ketone, 320 parts of cyclohexanone, and 80 parts of xylene. The "Durez" resin is preferably dissolved in some of the methyl isobutyl ketone before addition to the solution.

The above resin solution is used as described in Example I to give coatings which are resistant to blushing, staining, scratching, water, and neutral, acid, alkaline, and sulfur-containing foodstuffs under processing and storage conditions when applied to dipped tinplate, electrolytic tinplate, phosphatized black plate, and black plate.

When the method of the examples is repeated using in the place of the vinyl chloride-alpha,-beta-butenedioic ester copolymer, such vinyl chloride-vinyl acetate copolymers of various viscosities known under the trade names of Vinylite VYHH, VYNW, VYNS, or VMCH or other chlorine-containing polymers such as rubber hydrochloride or chlorinated rubber, the coatings obtained were found to be unsatisfactory for wet pack container uses since they lacked sufficient water-resistance and underwent severe blushing under processing conditions.

The vinyl chloride copolymers useful in this invention are those obtained by the conjoint polymerization of vinyl chloride with from 3% to 20% of an alkyl or aryl ester of fumaric or maleic acid (these two acids are represented by the formula HOOCCH=CHCOOH), citraconic, or mesaconic acid. The lower alkyl esters, that is, those in which the alkyl group contains not more than four carbon atoms, and particularly dimethyl or diethyl fumarate are of especial value in the practice of this invention. Particularly advantageous for the present purpose are the above defined copolymers which have a viscosity of from 0.5 to 1.5 poises as measured in a solution containing 10% of the copolymer by weight in cyclohexanone at 25° C. since it has been determined that a viscosity of less than about 0.5 poise leads to a product exhibiting poor heat stability even in the presence of 3% to 10% of a phenol-aldehyde resin. A copolymer exhibiting a viscosity greater than 1.5 poises is usable, but in some commercial applications is less suitable due to insufficient solubility in the high boiling solvents required for roller-coating operations.

The use of minor quantities of a heat-hardening phenol-formaldehyde resin is necessary to impart heat stability to the vinyl chloride-alpha,-beta-butenedioic ester copolymer. The heat-hardening phenol-formaldehyde resins best used in the practice of this invention are the alkyl substituted and polynuclear phenol-formaldehyde resins. Diphenylolpropane-formaldehyde heat-hardening resin has been found particularly useful. The amount of phenol-formaldehyde resin useful in this invention is from 3% to 10% of the total weight of resin solids. Although proportions greater than 10% of the phenol aldehyde can be used, in general such compositions no longer possess the outstanding flexibility necessary to withstand a deep die-drawing operation.

Solvents particularly useful in the preparation of the solution of the vinyl chloride copolymer and the heat-hardening phenol-formaldehyde resin are the aliphatic and cycloaliphatic ketones. The use of small proportions of an aromatic or aliphatic hydrocarbon as a thinner has also been found to be useful. The lacquer may also in some cases contain a small proportion of alcohol when the phenol-aldehyde resin used is prepared in an alcoholic solvent. However, the use of more than 5%–10% of an alcohol should be avoided since it is a coagulating agent for the vinyl chloride copolymer. Solvents in which the polymer composition is sufficiently soluble and which can be employed advantageously include methyl ethyl ketone, methyl isobutyl ketone, cyclohexanone, isophorone, lower alkyl nitro-paraffins, and tetrahydronaphthalene.

The time and temperature involved in the baking of these films are interdependent and must be sufficient to thoroughly remove the solvents employed in order that the taste characteristics of the foodstuff are not impaired by traces of a solvent. Thus while temperatures of 125°–200° C. for from 10 to 20 minutes are particularly useful, higher temperatures with lower baking times may be employed, for example, such as radiant or infrared heating or "flash" bake treatments involving very high temperatures for times as short as a minute or even less.

The thickness of the film upon the metallic surfaces for uses as food containers preferably should be that given by a coating weight of 2.5 and 5 mg. per sq. in. (approximately 0.2 mil in thickness) since thinner coatings are susceptible to "pin-hole" formation leading to short storage life of the container. Thicker coatings no longer possess sufficient heat stability to withstand baking at 200° C. or above.

The coatings of the present invention are of particular value when applied to black plate, dipped or electrolytic tin plate, and bonderized plate for fabrication into foodstuff containers, especially those containers for wet pack applications which must undergo processing at elevated temperatures in the presence of water. However, they are also useful for container closures, beverage containers, kegs, drums, tin foil, dry pack containers, and other uses involving protection against corrosive influences over such metals as terneplate, zinc, aluminum, magnesium, and copper. They have also found utility as wire enamels due to the excellent insulating properties combined with the requisite adhesiveness and flexibility. These coatings are particularly useful in that they can substitute for the tin coating over black plate for many wet pack container uses. They have also been found useful as top coats over phenol-formaldehyde resin base coats on black plate where particularly corrosive foodstuffs are used or where extremely long storage life of the container is required.

Although plasticizers can be used in these compositions in general the coating is flexible enough without such additives which may impair the impermeability characteristics that are obtained in their absence.

For certain foodstuffs and also for decorative applications it has been found useful to add pigments such as titanium dioxide or aluminum dust.

This invention makes possible the production of improved coated articles of enhanced utility by reason of the water resistance, inertness, impermeability, scratch-resistance, flexibility, adhesiveness, tastelessness, and particularly the blush resistance of the coating which offers the consumer foodstuffs in an attractive inclosure.

As many apparently widely different embodiments of this invention may be made without departing from the spirit and scope thereof, it is to be understood that I do not limit myself to the specific embodiments thereof except as defined in the appended claims.

I claim:
1. A metal container for the preservation of foodstuffs and beverages having as the interior coating for contact with the container contents a continuous coating of the dried film of a coating composition comprising a copolymer of vinyl chloride with from 3% to 20% of an alkyl diester of an acid of the formula HOOCCH=CHCOOH, the alkyl groups of said diester containing not more than four carbon atoms, and, based on the said copolymer, from 3% to 10% by weight of a heat-hardening phenol-formaldehyde resin.

2. The container set forth in claim 1 in which said alkyl diester is the dimethyl ester of said acid.

3. The container set forth in claim 1 in which said alkyl diester is the diethyl ester of said acid.

4. A metal container for the preservation of food and beverages having as the interior coating for contact with the container contents a continuous coating of the dried film of a coating composition comprising a copolymer of vinyl chloride with from 3% to 20% dimethyl fumarate, and based on the weight of said copolymer from 3% to 10% by weight of a heat-hardening phenol-formaldehyde resin.

5. Sheet metal coated on at least one surface thereof with a continuous coating of the dried film of a coating composition comprising a copolymer of vinyl chloride with from 3% to 20% of an alkyl diester of an acid of the formula

HOOCCH=CHCOOH the alkyl groups of said diester containing not more than four carbon atoms, and, based on the said copolymer, from 3% to 10% by weight of a heat-hardening phenol-formaldehyde resin.

6. The coated sheet metal set forth in claim 5 in which said alkyl ester is the dimethyl ester of said acid.

7. The coated sheet metal set forth in claim 5 in which said alkyl ester is the diethyl ester of said acid.

8. Sheet metal coated on one surface thereof with a continuous coating of the dried film of a coating composition comprising a copolymer of vinyl chloride with from 3% to 20% dimethyl fumarate, and based on the weight of said copolymer from 3% to 10% of a heat-hardening phenol-formaldehyde resin.

MILTON J. ROEDEL.

REFERENCES CITED

The following references are of record in the file of this patent:

UNITED STATES PATENTS

| Number | Name | Date |
|---|---|---|
| 957,137 | Baekeland | May 3, 1910 |
| 2,047,957 | Kenmore | July 21, 1936 |
| 2,187,817 | Hopff | Jan. 23, 1940 |
| 2,229,602 | Raynolds | Jan. 21, 1941 |
| 2,237,634 | Rosen | Apr. 8, 1941 |
| 2,270,662 | Raney | Jan. 20, 1942 |
| 2,293,413 | Stoner | Aug. 18, 1942 |
| 2,302,557 | Langkammerer | Nov. 17, 1942 |
| 2,306,576 | Warth et al. | Dec. 29, 1942 |
| 2,324,078 | Gray | July 13, 1943 |
| 2,324,739 | Stoops | July 20, 1943 |
| 2,329,456 | Campbell | Sept. 14, 1943 |
| 2,380,456 | Maier et al. | July 31, 1945 |